(12) United States Patent
Bouvet

(10) Patent No.: US 11,152,004 B2
(45) Date of Patent: Oct. 19, 2021

(54) METHOD FOR ACHIEVING REMOTE ACCESS TO A PERSONAL VOICE ASSISTANT

(71) Applicant: Orange, Issy-les-Moulineaux (FR)

(72) Inventor: Bertrand Bouvet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/698,270

(22) Filed: Nov. 27, 2019

(65) Prior Publication Data
US 2020/0168228 A1 May 28, 2020

(30) Foreign Application Priority Data
Nov. 28, 2018 (FR) ...................................... 1872002

(51) Int. Cl.
| | |
|---|---|
| *G10L 15/30* | (2013.01) |
| *G10L 15/08* | (2006.01) |
| *G10L 15/22* | (2006.01) |
| *H04L 29/06* | (2006.01) |
| *G10L 13/00* | (2006.01) |

(52) U.S. Cl.
CPC .............. *G10L 15/30* (2013.01); *G10L 13/00* (2013.01); *G10L 15/08* (2013.01); *G10L 15/22* (2013.01); *H04L 65/102* (2013.01); *H04L 65/1006* (2013.01); *H04L 65/403* (2013.01); *G10L 2015/088* (2013.01); *G10L 2015/223* (2013.01); *H04L 65/608* (2013.01)

(58) Field of Classification Search
CPC ......... G10L 15/30; G10L 15/08; G10L 15/22; G10L 13/00; G10L 2015/088; G10L 2015/223; H04L 65/1006; H04L 65/102; H04L 65/403; H04L 65/608
See application file for complete search history.

(56) References Cited

U.S. PATENT DOCUMENTS

| | | | |
|---|---|---|---|
| 9,699,409 B1* | 7/2017 | Reshef | ................ H04L 65/1089 |
| 9,953,650 B1* | 4/2018 | Falevsky | ................ G06F 3/017 |
| 9,967,381 B1* | 5/2018 | Kashimba | ............. H04M 7/006 |
| 10,143,027 B1* | 11/2018 | Singh | .................... H04W 76/14 |

(Continued)

FOREIGN PATENT DOCUMENTS

EP    2784774 A1    10/2014

OTHER PUBLICATIONS

Preliminary Search Report and Written Opinion dated Jun. 11, 2019 for French Application No. 1872002, filed Nov. 28, 2018.

(Continued)

*Primary Examiner* — Blake J Rubin
(74) *Attorney, Agent, or Firm* — David D. Brush; Westman, Champlin & Koehler, P.A.

(57) ABSTRACT

A method for achieving remote access to a voice assistant suitable for setting up telephone communications with a communication terminal via a telecommunications network. The method includes: setting up a first communication with a caller terminal; obtaining, via the set-up communication, a datum identifying the voice assistant; transmitting a setup message for setting up a second communication to the identified voice assistant, the message containing at least one parameter suitable for activating a remote operating mode of the voice assistant; and connecting the first and second communications.

14 Claims, 7 Drawing Sheets

(56) References Cited

U.S. PATENT DOCUMENTS

| | | | |
|---|---|---|---|
| 10,880,650 B2* | 12/2020 | Woo | H04R 5/04 |
| 2007/0043687 A1* | 2/2007 | Bodart | G06Q 10/107 |
| 2014/0164126 A1* | 6/2014 | Nicholas | G06Q 30/08 |
| | | | 705/14.58 |
| 2016/0224774 A1 | 8/2016 | Pender | |
| 2017/0244834 A1 | 8/2017 | Flores et al. | |
| 2017/0339278 A1* | 11/2017 | Wang | H04M 3/42093 |
| 2018/0054506 A1* | 2/2018 | Hart | H04M 1/271 |
| 2018/0165062 A1* | 6/2018 | Yoo | G16H 40/20 |
| 2019/0082043 A1* | 3/2019 | Lavian | H04M 1/2477 |
| 2019/0124049 A1* | 4/2019 | Bradley | H04L 63/164 |
| 2019/0158544 A1* | 5/2019 | Neck | G06F 16/9538 |
| 2019/0206412 A1* | 7/2019 | Li | H04L 12/2816 |
| 2019/0215288 A1* | 7/2019 | Diriye | H04L 51/18 |
| 2019/0349213 A1* | 11/2019 | Shive | G06N 5/025 |
| 2019/0373100 A1* | 12/2019 | Eubanks | H04M 1/7243 |
| 2020/0045041 A1* | 2/2020 | Heidari | G06Q 20/12 |
| 2021/0165631 A1* | 6/2021 | Blake | G06F 3/167 |

OTHER PUBLICATIONS

English translation of the Written Opinion dated Jun. 11, 2019 for French Application No. 1872002, filed Nov. 28, 2018.

\* cited by examiner

METHOD FOR ACHIEVING REMOTE ACCESS TO A PERSONAL VOICE ASSISTANT

TECHNICAL FIELD

The invention relates to the field of telecommunications and in particular relates to a method for achieving remote access to a personal assistant suitable for receiving voice commands pronounced by a user.

PRIOR ART

A voice assistant is a software application suitable for receiving commands pronounced orally in natural language and for rendering information in return by voice synthesis. These assistants are known to take the form of software packages run by mobile terminals, such as tablets or smartphones. Recently, these assistants have also begun to take the form of connected objects comprising a microphone and a loudspeaker, such objects being suitable for interpreting commands pronounced by users with regard, for example, to performing Internet searches or making requests for services, and rendering the result of the command by voice synthesis. Such connected "smart" objects are highly appreciated by the public.

To do all this, a voice assistant generally interacts with a remote server by virtue of an Internet connection. When a particular keyword pronounced by a user is detected, the assistant triggers the recording of an audio stream by means of a microphone and transmits the recorded stream to the server via the Internet connection. The server implements a voice-recognition algorithm in order to identify the user pronouncing the command among all the users with permission to use the assistant and in order to interpret the recognized commands. The server may then either process the command, or transmit the recognized command to the assistant so that it may be executed locally. The assistant then renders, via a loudspeaker, a response synthesized by a voice-synthesis algorithm.

A user may thus command a song to be played by pronouncing a phrase such as "[keyword] play a song by the Rolling Stones" or check the weather forecast by simply asking "[keyword] is it going to rain tomorrow?".

Certain assistants are furthermore able to be connected to a home-automation system in order to allow a user to interact with his home via voice commands such as "[keyword], close the shutters" or "[keyword], decrease room temperature by 2 degrees".

Voice assistants may even set up telephone communications with other terminals or servers via a telecommunication network. The voice assistant then behaves like a "handsfree" telephone terminal by means of which it is possible to set up communications with other terminals by pronouncing commands such as "[keyword], call Bob", "[keyword], hang up" or "[keyword], accept the call". To call "Bob", the assistant, or the server with which it is associated, then identifies the user from the timbre of his voice, accesses an address book of the identified user, searches for the number of "Bob" in the address book then makes a call to the corresponding number.

Thus, such assistants provide a voice interface between users and data hosted on servers or in databases.

It has however been observed that use of these devices remains limited. Although there are dedicated mobile applications with which it is possible to achieve remote access to certain functions performed by an assistant, other functionalities are accessible solely by voice command. The presence of the user in proximity to the device is then required, in order for the voice signal to be able to be captured by the microphone. However, it is sometimes desirable to be able to command such a device remotely, while preserving access to all of the available functions.

There is therefore a need for a solution that would allow a voice assistant such as described above to be accessed remotely and securely.

SUMMARY OF THE INVENTION

To this end, a method is proposed for achieving remote access to a voice assistant suitable for setting up telephone communications with a communication terminal via a telecommunications network.

The method is noteworthy in that it comprises the following steps:
  setting up a first communication with a caller terminal,
  obtaining, via the set-up communication, a datum identifying the voice assistant,
  transmitting a setup message for setting up a second communication to the identified voice assistant, the message containing at least one parameter suitable for activating a remote operating mode of the voice assistant,
  connecting the first and second communications.

Thus, a server receives a telephone call originating from a terminal from which a user desires to access the services offered by a voice assistant. After the voice assistant has been identified by virtue of an identifying datum transmitted in the communication, the server sets up a second communication with the voice assistant. The signaling allowing the second communication to be set up contains a particular parameter allowing the voice assistant to activate a remote operating mode. Once the second communication has been set up, the server connects the first and second communications, so that the audio stream originating from the terminal is directed in the set-up audio channel to the assistant, and so that the audio stream originating from the assistant is directed in the audio channel of the first communication to the terminal. The server plays an intermediary role between the caller terminal and the voice assistant. Such an arrangement makes it possible to offer a single telephone number to any user desiring to access their voice assistant remotely, to control access rights to the assistant, and to insert a particular parameter in the communication-setup request for remote access sent to the assistant. It is thus possible to achieve remote access to a voice assistant from a conventional terminal that is not suitable for adding a particular parameter to the call signaling.

In this way, a user may transmit voice commands to an assistant when he is not within range of the microphone of the assistant.

According to one particular embodiment, the method for achieving remote access is such that it furthermore comprises a step of obtaining an authenticating datum from the caller terminal, the step of transmitting a communication-setup message to the voice assistant being dependent on a step of validating the obtained authenticating element.

The method thus allows access to the assistant to be made more secure. The authenticating datum is for example a PIN code transmitted by the user of the terminal. When the communicated PIN code is not validated by the server, the second communication is not set up with the voice assistant. According to one particular embodiment, the identifying datum is a voice print obtained by analyzing the timbre of the voice of the user. User experience is thus improved.

According to one particular embodiment, the datum identifying the voice assistant, which datum is obtained via the first communication, is a call identifier of the caller terminal. Thus, the user does not need to communicate an identifier of the voice assistant with which it is desired to set up a communication. To this end, the server may for example have available to it a table in which an identifier or an address of a voice assistant is associated with a telephone number, thus allowing a voice assistant to be contacted when a call is made to be identified.

According to one particular embodiment, the method is such that the datum suitable for activating a particular operating mode is a parameter chosen from among the following parameters:
- a certified caller No., for example delivered in an SIP (RFC3261 Session Initiation Protocol) PAI (P-Asserted-Identity) header,
- an uncertified caller No., for example contained in a "FROM" header of an SIP message,
- a caller name delivered by a CLIP (Calling Line Identification Presentation) service, typically in the SIP DISPLAY field of the PAI and/or FROM header,
- specific information on the location of the caller terminal, typically a PANI (Private-Access Network Information) SIP field,
- a particular value of a User Agent SIP header,
- a specific SIP server identifier,
- an attribute of the SDP (IETF RFC4566 Session Description Protocol) protocol specific to the SIP protocol allowing the media stream to be negotiated,
- a specific IP (Internet Protocol) source address of a server,
- a specific domain name in a URI (Uniform Resource Identifier),
- a specific SIP header,
- an extension of the ISUP/BICC (ISDN Signaling User Part/Bearer-Independent Call Control) protocol in the case where interconnection with a circuit network is employed, for example with the "generic notification flag" information element.

Thus, the presence of such a parameter in the call signaling allows a voice assistant to detect that the communication-setup request is at the initiative of a remote-access server and not a conventional telephone call, and to activate a resource-management mode suitable for the remote access.

According to one particular embodiment, the method for achieving remote access comprises a step of configuring a wideband codec for the first and second communications. A wideband audio codec allows a high-quality audio communication to be set up between the terminal and the voice assistant, thus allowing the voice recognition of the commands transmitted by the user to work more effectively. A wideband codec also allows a better identification of the user from the timbre of his voice. Such a measure contributes to further improving user experience.

According to another aspect, the invention relates to a device for achieving remote access to a voice assistant suitable for setting up telephone communications with a communication terminal via a telecommunications network, the device being such that it comprises:
- a first communication module, suitable for setting up a first communication with a caller terminal,
- an identification module, suitable for obtaining a datum identifying the voice assistant via the set-up communication, and for obtaining an address of a voice assistant,
- a second communication module, suitable for transmitting to the obtained address a setup message for setting up a second communication, the message containing at least one parameter suitable for activating a remote operating mode of the identified voice assistant, and
- a connection module for connecting the first and second communications, said module being suitable for retransmitting to the voice assistant an audio stream originating from the terminal, and for retransmitting to the terminal an audio stream originating from the voice assistant.

In one particular embodiment, such a device furthermore comprises an authentication module suitable for obtaining and verifying an authenticating datum transmitted via the communication set up with the caller terminal.

The invention also relates to a server comprising a device for achieving remote access such as described above.

In addition to the method for achieving remote access, the invention relates to a method for processing a request for remote access to a voice assistant suitable for setting up telephone communications with a communication terminal via a telecommunications network, the voice assistant being associated with a voice-recognition device for analyzing a voice command pronounced by a user, the analysis being activated following detection of a keyword by the voice assistant, and with a voice-synthesis device for vocalizing a response to said voice command, the method being such that it comprises the following steps:
- receiving a setup message for setting up a voice communication, the message containing at least one remote access parameter,
- activating a particular operating mode comprising the following substeps:
  - redirecting an incoming audio stream of the telephone communication to the associated voice-recognition device, in replacement for the signal captured by the microphone,
  - redirecting an audio stream generated by the associated voice-synthesis device to an outgoing audio channel of the communication,
- once the particular operating mode has been activated, transmitting a communication acceptance message.

Thus, reception by a voice assistant of a communication-setup voice request containing a particular parameter causes the activation of a particular operating mode allowing remote access. In this way, the voice assistant behaves differently depending on whether the incoming communication is a conventional voice communication or a remote-access communication. The activation of the particular operating mode comprises at least one step in which the voice-recognition device, whether it is implemented by the assistant itself or by a server, receives audio data originating from the remote terminal instead of the audio signal captured by the microphone. In this way, the voice commands pronounced orally by the remote user are transmitted via the set-up communication to the voice assistant and processed by the latter or by the server with which it is associated, as though they were a spoken signal captured locally by the microphone. Likewise, the audio signal synthesized by the voice assistant, or by the server with which it is associated, and which would be rendered by a local loudspeaker in a nominal operating mode of the assistant, is transmitted to the remote terminal via the set-up communication. In this way, the user may remotely hear the result of a voice command processed by the assistant.

According to one particular embodiment, the method for processing a request for remote access is such that the activation of the remote operating mode furthermore comprises a configuring substep aiming to make it so that recording of the incoming audio stream of the communication by the capturing device is activated without a keyword being detected. In other words, prior detection of a keyword to identify a command pronounced by a user is deactivated, any words pronounced by the user via the remote-access communication then being processed by the assistant as a command.

Conventionally, a voice assistant records a command when a predefined keyword is pronounced by the user. For example, a voice assistant will interrogate a weather service when the phrase "[keyword], what will the weather be like tomorrow?", but will ignore the command if the keyword is not detected beforehand. Such a measure aims to prevent a voice assistant from interpreting conversations of users within range of the microphone as commands. Confidentiality is thus improved. However, in a remote-access context, the words pronounced by the user are exclusively intended for the voice assistant and the introduction of each command by a keyword is superfluous, confidentiality being guaranteed by the voice communication. The method thus proposes to simplify interactions between the assistant and the user via a specific configuration of the assistant allowing the user to not use keywords.

According to one particular embodiment, the method for processing a request for remote access is such that the activation of the remote operating mode furthermore comprises a configuring substep aiming to make it so that a restriction of access to at least one service of the assistant is activated.

The method thus proposes to make access to certain services offered by the assistant (services to which remote access is undesirable) more secure. Security is thus increased.

According to one particular embodiment, the activation of a remote operating mode comprises deactivating the microphone and/or the loudspeaker of the assistant.

Such a measure allows the confidentiality of exchanges made while the voice assistant is being accessed remotely to be preserved, the result of the commands not being vocalized in the immediate environment of the assistant.

According to another aspect, the invention relates to a device for processing a request for remote access to a voice assistant suitable for setting up telephone communications with a communication terminal via a telecommunications network, the voice assistant being associated with a voice-recognition device for analyzing a voice command pronounced by a user, the analysis being activated following detection of a keyword by the voice assistant, and with a voice-synthesis device for vocalizing a response to said voice command, the device comprising:

a communication module suitable for receiving a setup message for setting up a voice communication, the message containing at least one parameter suitable for activating a remote operating mode of the voice assistant, an activation module for activating a remote operating mode, comprising an audio routing module suitable for:
redirecting an incoming audio stream of the telephone communication to the voice-recognition device in replacement of the signal captured by the microphone,
redirecting an audio stream generated by the voice-synthesis device to an outgoing audio channel of the communication, the communication module furthermore being suitable for transmitting a communication acceptance message when the particular operating mode is activated.

The invention also relates to a voice assistant comprising a device for processing a request for remote access such as described above.

In one particular embodiment, the various steps of the methods for achieving remote access and for processing a request for remote access are determined by the instructions of computer programs.

Therefore the invention also relates to a computer program containing instructions for executing the steps of the method for processing a remote-access request and/or instructions for executing the steps of the method for achieving remote access, when said program is executed by a processor.

Such a program may use any programming language, and take the form of source code, object code or code intermediate between source code and object code, such as a partially compiled form, or any other desirable form.

Lastly, the invention relates to a processor-readable data medium on which a computer program containing instructions for executing the steps of the distributing method is stored.

The data medium may be any entity or device capable of storing the program. For example, the medium may comprise a storing means, such as a ROM, for example a CD-ROM or a microelectronic ROM circuit, or even a magnetic storing means, for example a floppy disk or a hard disk or even a flash memory. Furthermore, the data medium may be a transmissible medium such as an electrical or optical signal, which may be conveyed via an electrical or optical cable, by radio waves or by other means. The program according to the invention may in particular be downloaded over a network such as the Internet.

Alternatively, the data medium may be an integrated circuit into which the program is incorporated, the circuit being suitable for executing or for being used in the execution of the methods in question.

The servers, assistants, devices, programs and data media have at least analogous advantages to those conferred by the corresponding methods.

The various aforementioned embodiments and features may be added, independently or in combination with one another, to the steps of the method to which they relate.

BRIEF DESCRIPTION OF THE FIGURES

Other features and advantages of the invention will become more clearly apparent on reading the following description of one particular embodiment, which is given by way of nonlimiting illustration, and the appended drawings, in which.

DETAILED DESCRIPTION

Figure 1:
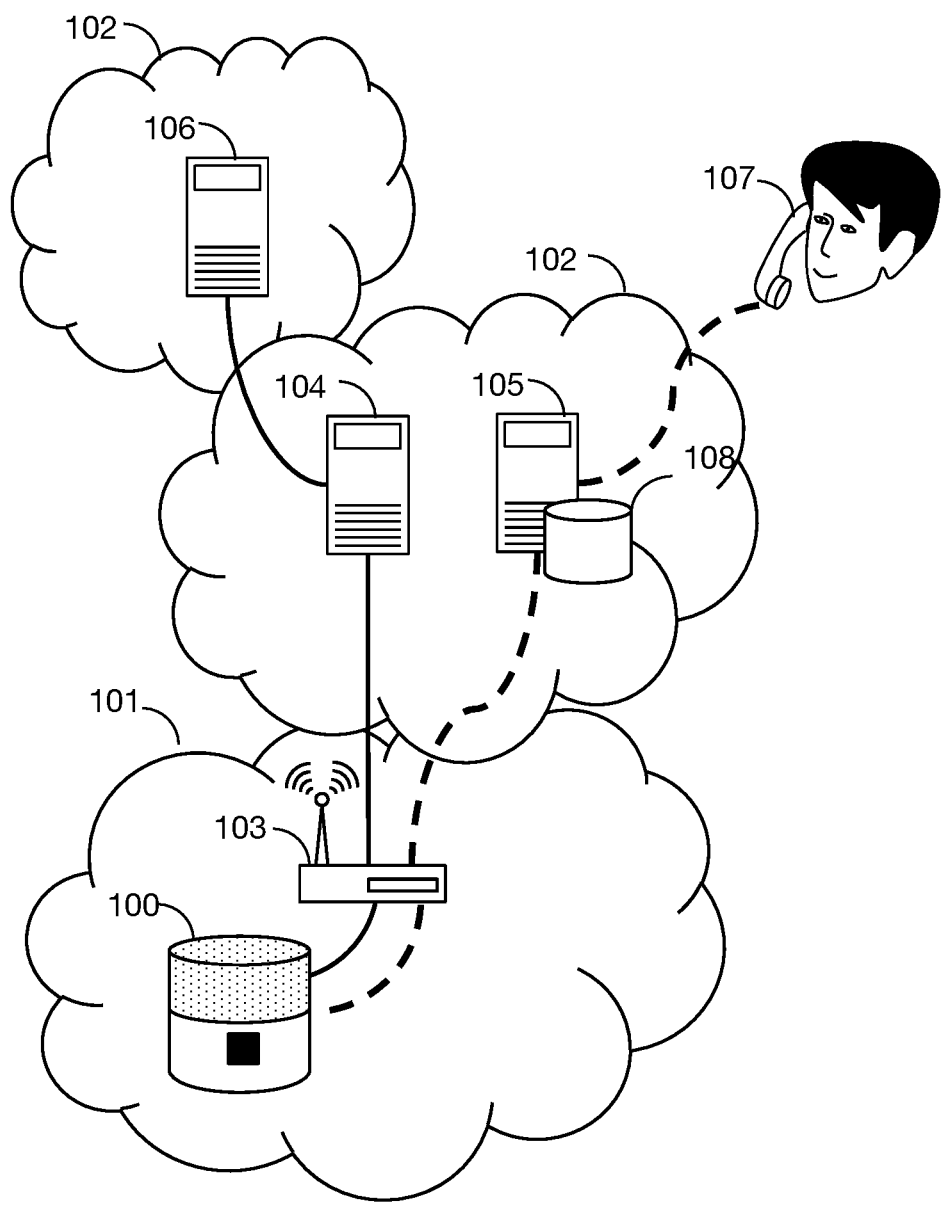
FIG. 1 illustrates a network architecture suitable for implementing the invention according to one particular embodiment.
Figure 2:
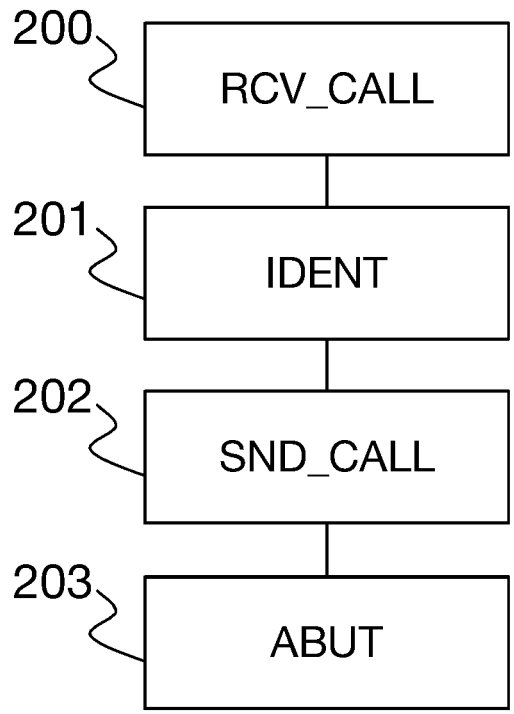
FIG. 2 shows the main steps of the method for achieving remote access, according to one particular embodiment.
Figure 3:
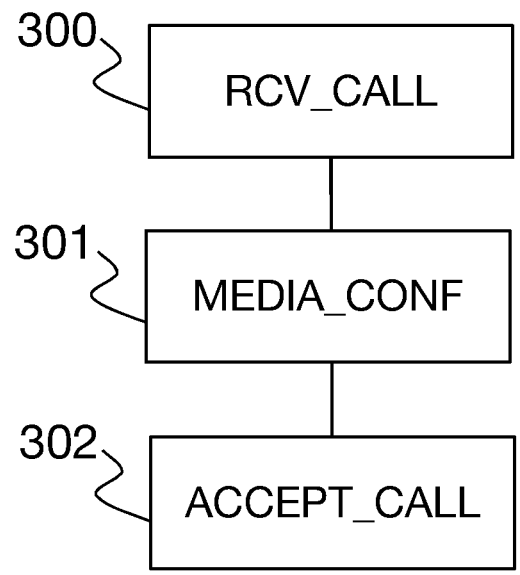
FIG. 3 shows the main steps of the method for processing a request for remote access, according to one particular embodiment.

FIG. 1 shows a voice assistant 100 within a local network 101. The local network 101 is interconnected with a telecommunications network 102 via a gateway 103. Such a gateway is for example a residential gateway of modem-router type. The voice assistant may thus access services offered by servers 104 and 105.

Conventionally, a voice assistant such as the assistant 100 comprises a device for acquiring and rendering audio associated with a loudspeaker and a microphone, a processor, and a memory into which a software package containing instructions intended to be executed by the processor is loaded. The assistant 100 furthermore comprises at least one communication interface, such as a Wi-Fi or Ethernet network interface or an interface with a cellular data network, for example a 3G or 4G network, allowing it to send and receive messages via a communication network.

The software package is configured to analyze the audio signal captured by a microphone in order to detect therein a keyword pronounced by a user in proximity to the assistant. The keyword furthermore allows the person (selected from a plurality of preconfigured people) who pronounced the keyword to be identified by the assistant from characteristics of the timbre of the voice of the user, with the aim of contextualizing requests.

Following the detection of a keyword, the assistant 100 records the commands pronounced by the user and transmits the corresponding digitized audio signal to the server 104. The server 104 has available to it a voice-recognition software package by virtue of which it interprets the request. The server 104 also places the request in context, for example in light of the identified user and/or the location in which the assistant is installed. Such contextualization of the request for example allows the assistant 100 to reply with the local weather when a user simply pronounces a command such as "[keyword] what will the weather be like tomorrow?".

The server 104 may consult various databases to obtain a response to the request. For example, the server 104 transmits the interpreted and contextualized request to a partner server 106 suitable for responding thereto.

The server 104 then returns the obtained response to the assistant. The response may be returned in the form of an audio signal produced by voice synthesis, or indeed the assistant 100 may itself, by virtue of its software package, synthesize a voice response.

Lastly, the assistant renders the vocalized response by virtue of its rendering device.

The assistant 100 furthermore comprises a telephony module permitting voice communications to be set up with other terminals. For example, the assistant 100 may set up a voice communication with a telephone terminal 107 via the telecommunication network 102.

To this end, the assistant may comprise a telephony module according to the DECT (Digital Enhanced Cordless Telecommunications) or CAT-iq (Cordless Advanced Technology-internet and quality) standard, said module being suitable for registering with a compatible base station comprised in the residential gateway 103. Thus, from the point of view of the gateway, the assistant 100 is seen as a conventional DECT handset. The user may control the telephony function by pronouncing voice commands such as "[keyword], call my daughter", "[keyword], hang up", etc. Once a communication has been set up, the voice of the remote user is rendered via the loudspeaker of the assistant 100, and the voice of the local user is captured by the microphone of the assistant then transmitted to the correspondent.

The voice assistant 100 being configured to set up telephone communications with other terminals, it is associated with a call identifier, such as a telephone number, an SIP URI or any other address allowing it to receive telephone calls. This call number may be shared between a plurality of communication terminals of a domestic installation.

According to one particular embodiment, the call identifier is not directly associated with the voice assistant 100, but with the residential gateway 103. The gateway 103 comprises a telephony base station according to the DECT (Digital Enhanced Cordless Telecommunications) or CAT-iq (Cordless Advanced Technology-internet and quality) standard, with which DECT terminals may register. Thus, from the point of view of the gateway, the assistant 100 is seen as a conventional DECT terminal. Other compatible terminals may in the same way be associated with the residential gateway. In this case, when a call-setup message is received by the gateway 103, the gateway 103 transmits in a conventional way a call setup signal CC-SETUP to all the terminals associated with the base station.

In another embodiment, the assistant comprises an SIP communication module suitable for registering directly with a communication service offered by the network 102, or with an SIP server comprised in the gateway 103.

FIG. 1 also illustrates a server 105 suitable for implementing the method for achieving remote access according to the invention. The server 105 comprises a processor, a memory containing computer-program instructions suitable for being executed by the processor, and at least one network interface controlled via the instructions.

The method for achieving remote access will now be described with reference to FIGS. 2 to 5.

Figure 5:
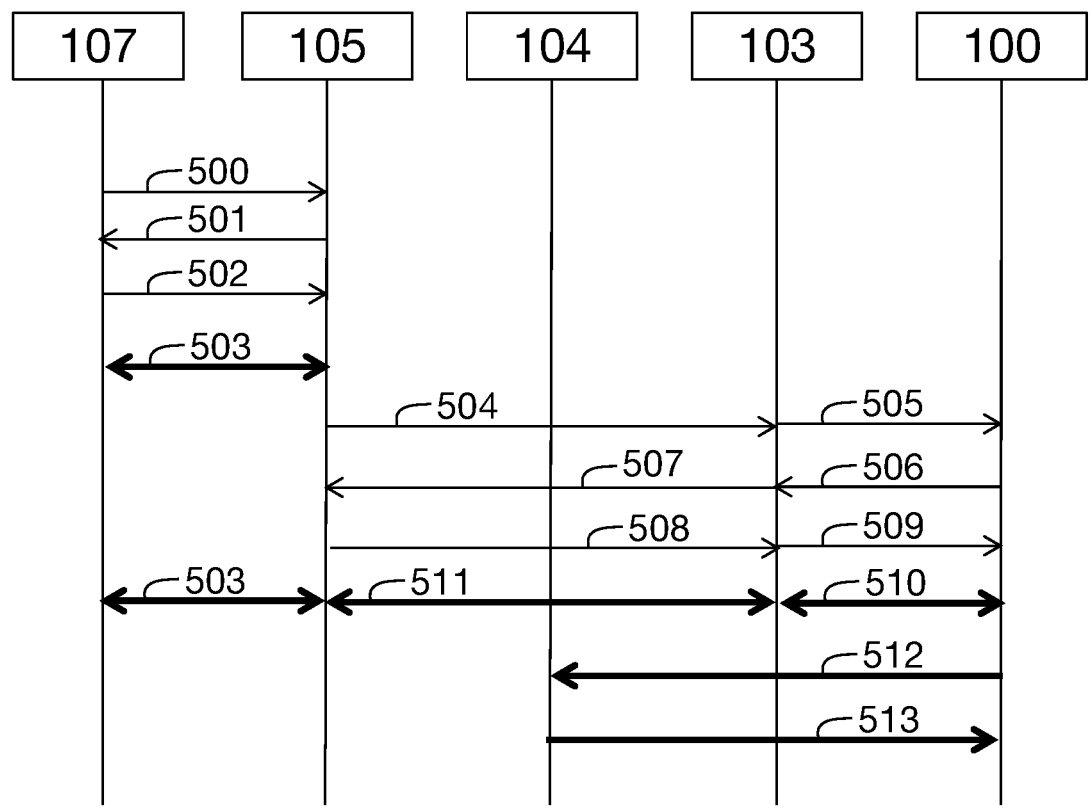
FIG. 5 shows a timing diagram of the messages exchanged to implement the invention according to one particular embodiment.

FIG. 5 shows a timing diagram of the messages exchanged between the terminal 107, the remote-access server 105, the gateway 103 and the voice assistant 100. Of course, this schematic is not exhaustive and other messages may be exchanged between the various entities. The telecommunication network may furthermore comprise other intermediate entities that are not shown in FIG. 5.

In a first step 200, the server 105 receives a communication-setup request originating from the terminal 107. It is for example a question of an SIP INVITE message 500 for setting up an audio communication at the initiative of the terminal 107. The server then responds in the conventional way with an SIP 200 OK message 501, which is acknowledged by an SIP ACK message 502. Following these exchanges of messages, a bidirectional RTP (Real-Time Transport Protocol) audio stream 503 is set up between the terminal 107 and the remote-access server 105. Of course, other communication protocols may be employed to set up the communication between the server 105 and the terminal 107.

To this end, the server 105 has a communication interface suitable for exchanging messages with terminals such as the terminal 107. For example, the server 105 comprises a communication interface suitable for setting up communications according to the SIP or ISUP protocol or even GSM, 3G or 4G communications. The server 105 furthermore has a call number, such as an E.164 identifier or an SIP URI able to be dialed by the terminal 107 to set up the communication.

According to one particular embodiment, the terminal 107 accesses the service via a service of the "click-to-call" type. In this case, the user of the terminal 107 for example connects to a website and inputs, via an interface provided to this end, the telephone number of the terminal 107 with which he desires to use his voice assistant remotely. The "click-to-call" service then generates a call to the number of the terminal 107 in order to set up the communication. Since the call is then at the initiative of the server, the user of the terminal 107 is not billed.

According to another particular embodiment, the terminal 107 accesses the remote-access service using the WebRTC (Web Real-Time Communication) technology (which was developed by the IETF and W3C), i.e. through an http connection.

In step 201, following the setup of the communication with the terminal 107, the server 105 obtains a datum identifying the voice assistant 100. To this end, the server 105 employs an interactive voice service that invites the user of the terminal 107 to indicate an identifier of the voice assistant to which he wants remote access. The identifiers are for example delivered by DTMF or voice commands. Such an identifier is for example a telephone number, an email address, a customer account number, or even a unique identifier of the assistant, such as a series number for example.

According to one particular embodiment, the identifier is the call number of the terminal 107. The identifier is thus obtained by the server 105 directly from the communication-setup message. In this way, the server 105 may identify, via the remote-access request, the voice assistant in question as soon as the communication is received. To this end, the server 105 analyzes the communication-setup messages, such as the message 500, in order to extract the number of the caller terminal therefrom. In the case of a communication set up according to the SIP protocol, the identifier of the caller terminal may be found in a "FROM" header of the SIP INVITE message 500, or in a P-Asserted-Network-ID header of the same message.

In this particular case, the identifier of the terminal 107 is associated beforehand with the voice assistant 100. This association is for example achieved via a web portal or a dedicated application and stored in a memory accessible to the server 105, for example in a database 108. In this way, the user of the terminal 107 does not need to transmit an identifier of the voice assistant: obtainment of the datum identifying the voice assistant is automated, and user experience is then improved.

According to one particular embodiment, the server 105 furthermore obtains an authenticating datum, for example a PIN (Personal Identification Number) code, a voice print or a password. The authenticating datum may be transmitted by the terminal 107 by DTMF (Dual Tone Multi-Frequency). When that the authenticating datum is a voice print, the server 105 may delegate the identification of the user to the server 104, which then has available to it functions provided for this purpose. Such a measure improves security by preventing access by anyone who does not know the authenticating datum.

In step 202, the server 105 transmits a setup message for setting up a second communication to the voice assistant 100, for example an SIP INVITE message 504. This message contains at least one parameter suitable for activating a remote operating mode of the voice assistant.

Such a specific parameter may be a single element or a combination of elements among the following:
- an SIP FROM header. It is a question of an uncertified number of the caller, which communication networks guarantee to route,
- a P-Asserted-ID (PAI) header. It is a question of one or more certified numbers of the caller, in SIP URI format or in TEL URI format,
- a caller name (CNIP) present in the SIP DISPLAY parameter of the SIP FROM or PAI header,
- a specific SDP (Session Description Protocol) attribute, for example the addition of a value transmitted via the attribute "a=" of an SDP message, conventionally used to indicate the direction of a medium (sendrecv, recvonly, sendonly, inactive), for example, "a=reverse",
- an SIP User Agent header,
- an SIP Server header,
- a specific domain name of the Request-URI and/or of the TO, FROM, PAI, contact address, or any other field suitable for signaling a remote-access communication,
- an SIP PANI header allowing location information to be delivered,
- a source IP address corresponding to the server 105.

The message 504 and the parameter are received by the gateway 103. On reception of the message, the gateway may transmit an incoming call signaling message 505:
- either solely to the assistant 100,
- or to all the communication terminals associated with the gateway, including the assistant 100.

The first particular case requires the gateway to be able to identify the voice assistant 100 among the other communication terminals that are associated therewith, this for example being envisionable when the communication terminals associated with the gateway 103 are SIP terminals capable of identifying themselves in a registration message and of communicating capabilities, or even when they are terminals according to the DECT standard associated with a DECT base station comprised in the gateway 103.

The second particular case is to be envisioned when the gateway 103 is unable to identify, among the connected terminals, a voice assistant capable of processing the remote-access request.

In step 300, the assistant 100 receives the message 505 and searches in this message for the presence of the remote-access parameter described above. The message 505 may have been retransmitted by the gateway using a communication protocol different from the communication protocol used between the server 105 and the gateway 103. For example, the message 504 may be relayed by the gateway 103 to the assistant 100 using the DECT standard, in the form of a DECT message 505.

When the voice assistant is suitable for setting up communications using the SIP protocol, the message 505 is an SIP INVITE message. The message 505 may be a simple retransmission of the message 504, or indeed the gateway may generate a new SIP INVITE message containing the remote-access parameter.

When the voice assistant 100 is suitable for registering with an internal DECT base station of the gateway 103 with a view to setting up the communications, the message 505 is for example a CC-SETUP message into which the gateway inserts the remote-access parameter received in the message 504.

According to one particular embodiment, when the call-setup message received by the gateway 103 contains at least one parameter suitable for activating a remote operating mode of the voice assistant such as described above, the gateway transmits a call-setup signal solely to the DECT terminal of the voice assistant. In this way, the other DECT terminals associated with the DECT base station are not asked to set up a call when it is a question of a remote-access request. Each DECT terminal is allocated a specific identifier that is stored by the DECT base station of the gateway 103 when it is paired therewith. It is therefore possible, via a configuration interface of the gateway 103, to list the one or more DECT terminals paired with the internal DECT base station of the gateway 103, then to configure a rule that ensures that the DECT terminal of the assistant 100 is only asked to set up an incoming call when the caller number is the number of the remote-access server 105. Such a rule is for example stored in an association table stored in a memory of the gateway 103. The same principle is applicable when the base station and the terminals are for example a server and terminals employing the SIP standard.

The DECT base station of the gateway 103 may be configured to collect all or some of the parameters of the incoming SIP message and to insert them, when it is possible, into the DECT protocol. For example, the specific certified (PAI) or uncertified (FROM) SIP caller number may be added to the field "Calling Party Number" of the DECT CC-SETUP message. The gateway 103 may also give specific values to certain fields of the DECT protocol (for example "Number Type", "Numbering Plan", "Presentation Indicator", "Screening Indicator", "Calling Party Address", etc.) in order that the voice assistant 100 be able to detect this specific parameter and configure a remote-access operating mode.

The specific parameter contained in the message 505 may indicate to the voice assistant that it must adopt, in step 301, a particular operating mode comprising replacing the audio stream conventionally captured by the microphone, in order to record the voice commands, with the telephone voice stream received from the caller. In this way, the stream analyzed to detect voice commands is no longer the stream obtained via the microphone, but the stream received in the telephone communication. Furthermore, the audio stream obtained in response to a voice command and conventionally intended to be rendered by the loudspeaker of the assistant is transmitted to the caller via the set-up telephone communication. In this way, the responses conventionally rendered by the voice assistant 100 are transmitted to the terminal 107 and rendered to its user.

Such a modification of the routing of the incoming and outgoing audio streams may be achieved in various ways.

Figure 4A:
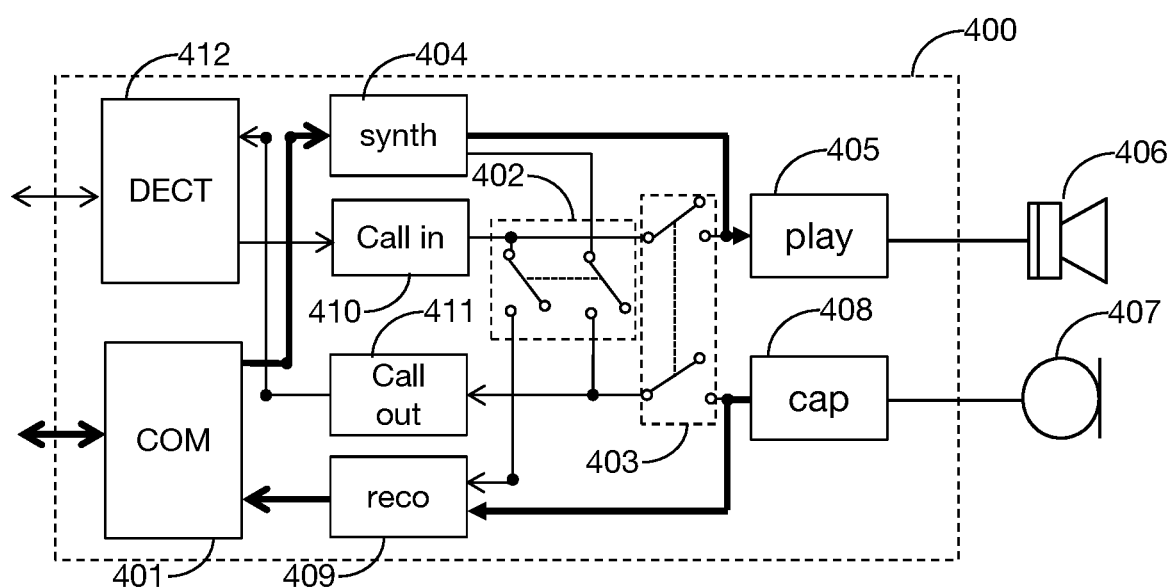
FIGS. 4a, 4b and 4c illustrate in a simplified manner the architecture of a device for processing a request for remote access, said device being suitable for controlling the routing of the audio streams from the voice assistant in one particular embodiment.
Figure 4B:
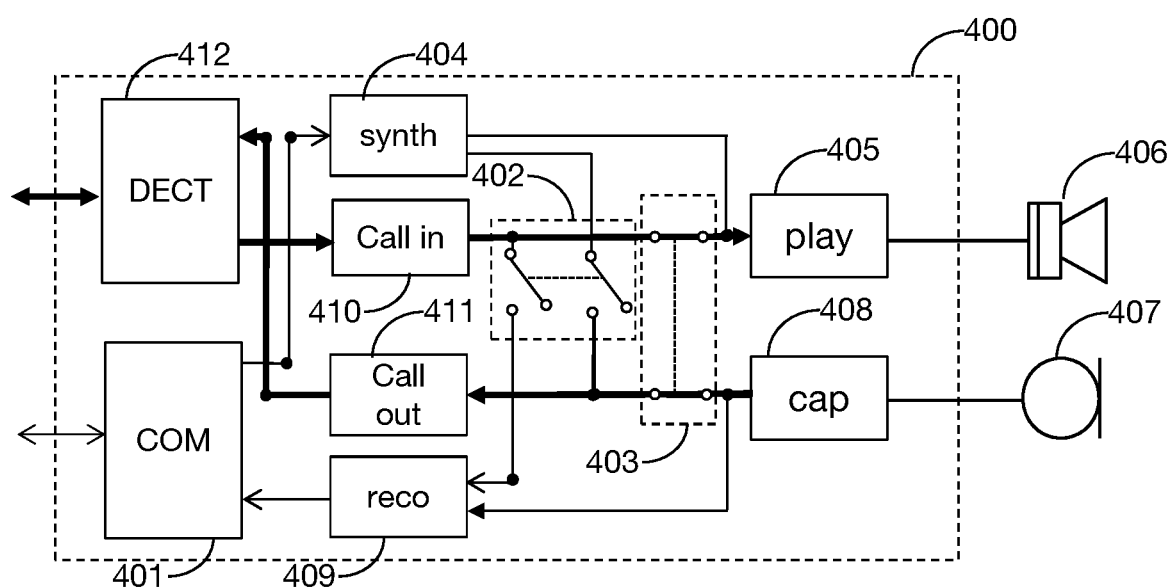
Figure 4C:
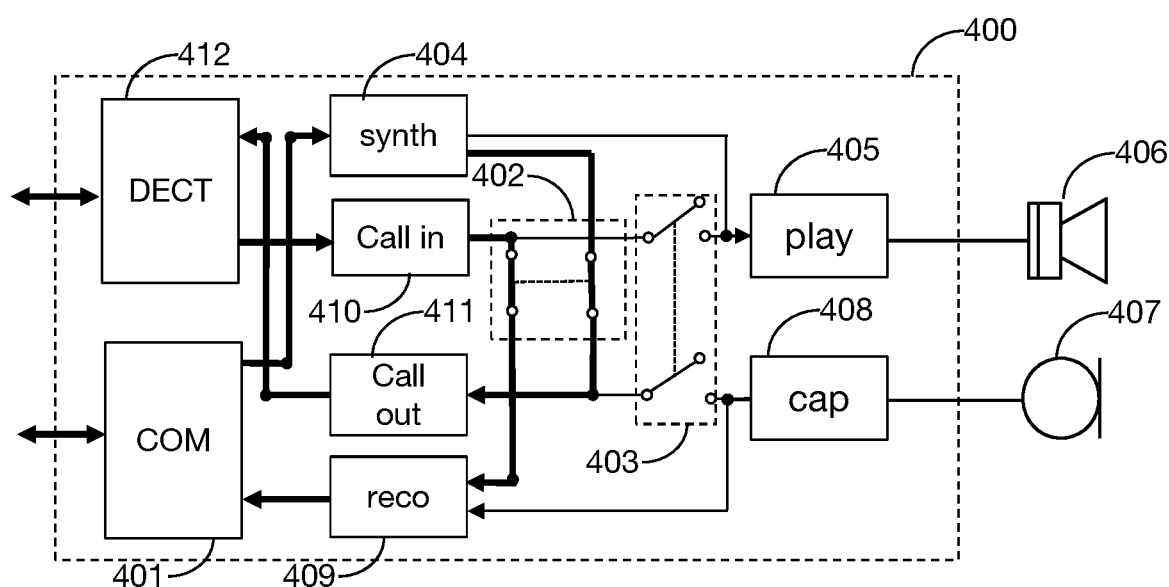

FIGS. 4a, 4b and 4c schematically illustrate an architecture of a device 400 suitable for controlling the routing of audio streams from the voice assistant 100, according to various particular embodiments. Such a device is for example integrated into the voice assistant 100.

The device 400 comprises a communication module 401. It is for example a question of a Wi-Fi or Ethernet network interface allowing the assistant to exchange data with other devices, such as the server 104 associated with the assistant. For example, the module 401 allows requests to be sent to the server 104 and responses to these requests to be received using the http protocol.

The device 400 comprises configurable modules 402 and 403 for routing the audio streams to various recipient modules. In the configuration of FIG. 4a, the modules 402 and 403 are in an inactive state corresponding to a nominal assistant operating mode, in which the voice commands captured by the microphone 407 and the capturing module 408 are routed to a voice-recognition module 409 and the network interface 401 in order to be transmitted to the server 104, and in which the responses received by the interface 401 are processed by a voice-synthesis module 404 and a rendering system 405, 406. The path of the streams through the device 400 is represented by bold arrows in FIGS. 4a, 4b and 4c.

The modules 402 and 403 are for example implemented by a DSP (Digital Signal Processor) or by an all-purpose processing unit configured by programming instructions that make it so that audio streams received via a particular input are routed to a particular output. The modules 402 and 403 may also correspond to relays, transistors or any other components suitable for redirecting a signal received via an input to a particular output, and that are controlled by a processing unit configured by computer-program instructions. The configuration of the modules 402 and 403 is controlled by a processor depending on the operating mode of the assistant 100, which is determined by the presence or absence of the remote-access parameter in the received message 505.

FIG. 4b shows the routing device 400 in a configuration suitable for an audio-communication operating mode. In this operating mode, the assistant 100 behaves like a DECT telephone terminal. In this configuration, the module 403 is configured so that the streams captured by the acquiring device 408 and the microphone 407 are directed to the DECT communication module 412 via a device 411 for processing outgoing communications. The module 411 is for example an encoder suitable for compressing the captured audio stream into a format compatible with the communication standard employed by the assistant 100. The configuration of the module 403 shown in FIG. 4b also allows the audio stream received by the DECT communication module 412 and decoded by the module 410 for processing incoming communications to be directed to the rendering module 405 for and the loudspeaker 406.

FIG. 4c illustrates the routing device 400 in one particular operating mode according to the present invention. In this configuration, the module 402 is configured so that the audio stream generated by the voice-synthesis module 404 is directed to the audio processing module 411 for the outgoing communications, and so that the audio stream received via the incoming audio communication module 410 is directed to the voice-recognition module 409. In this way, the audio stream received during a communication set up with a correspondent is decoded by the module 410 then transmitted to the voice-recognition module 409 before being transmitted to the server 104 via the communication interface 401. Likewise, the response of the server 104 is received by the communication interface 401 and vocalized by the voice-synthesis module 404, then the audio stream resulting from this processing is transmitted to the encoding module 411 then to the correspondent via the DECT communication module 412.

In one particular embodiment, the device 400 furthermore comprises additional means for deactivating the loudspeaker when the particular operating mode of FIG. 4c is activated. In this way, the voice commands pronounced by the user of the terminal 107 are not rendered locally by the voice assistant 100 while it is being accessed remotely. Confidentiality is thus preserved. Likewise, additional means allow, in one particular embodiment, the microphone 407 of the module 400 to be deactivated. In this way, words pronounced in proximity to the assistant 100 while it is being accessed remotely do not run the risk of interfering with commands pronounced by the user of the terminal 107. Such means for deactivating the loudspeaker and/or the microphone are for example an electromagnetic relay, a transistor, a DSP configured to block the corresponding audio inputs or outputs or any other mean allowing the circuit between the synthesis module 404 and the loudspeaker 406 to be broken and/or the circuit between the microphone 407 and the voice-recognition module 409 to be broken.

In step 302, when the message 505 contains the remote-access parameter, the assistant adopts a particular operating mode that automatically accepts the communication. Thus, the communication is immediately picked up by the voice assistant 100. In this way, when the gateway 103 receives the communication-acceptance message from the voice assistant, it cancels the call setup request made to the other connectable terminals. Such a measure allows a remote-access communication to be set up with the voice assistant even when the gateway is not is not able to differentiate between a voice-assistant terminal and a conventional telephone terminal. Specifically, by virtue of the specific parameter contained in the message 505, the voice assistant 100 determines that the communication is a remote-access communication that is intended for it and automatically accepts the call.

The voice assistant accepts the call by returning a response message 506, for example a DECT CC-CONNECT message or indeed an SIP 200 OK message, depending on the technology used by the voice assistant. Conventionally, the transmission of such a response is triggered by detection of a suitable voice command pronounced by the user following the setup of the call. In the context of the present invention however, this response is transmitted automatically when the setup message contains the remote-access parameter, i.e. no user action is necessary for the assistant 100 to accept the call.

The server 105 receives the call-acceptance message 507 transmitted by the voice assistant 100 in step 203. It may be a question of a simple retransmission of the message 506 when the protocol employed between the assistant 100 and the gateway 103 is the same protocol as that used between the gateway 103 and the server 105, but it may be a different type of message when the assistant uses a different protocol from that employed between the gateway 103 and the server 105. On reception of the message, the server 105 may acknowledge the message 507 for example by sending an SIP ACK message 508 to the voice assistant 100 or to the gateway 103. This message may be retransmitted by the gateway 103 to the assistant 100 in the form of an SIP ACK or CC-CONNECT-ACK message 509 if the terminal is a DECT terminal.

At this stage, a bidirectional audio connection 510, 511 is set up between the server 105 and the voice assistant 100.

The server 105 connects the communication set up with the terminal 107 and the communication set up with the assistant 100. The connecting step 203 may be implemented using a "back-to-back user agent" (B2BUA) technique. In such an embodiment, the server 105 comprises two SIP User Agents: a first is tasked with the communication with the terminal 107, the other with the communication with voice assistant and/or the gateway 103. In such an embodiment, events affecting one communication are passed on by the server to the other communication. For example, when a "SIP BYE" message is received by the server 105 from the terminal 107, the server generates and sends an SIP BYE message to the voice assistant. Likewise, the server 105 relays bidirectionally the audio streams 511, 510 to the terminal 107 via the connection 504.

The device shown in FIGS. 4a to 4c comprises voice-synthesis and voice-recognition modules 404 and 409. However, in other particular embodiments, the voice-synthesis and voice-recognition functions may be implemented on a server, for example on the server 104. In such a case, the audio stream 510 received from the terminal 107 is transmitted to the server 104 in the form of an audio stream 512. The server 104 then performs voice recognition and executes the commands pronounced by the user of the terminal 107. Conversely, the response to the request is vocalized by the server 104 using a voice-synthesis module. The server 104 transmits the response to the command of the user in the form of a synthesized audio stream 513.

According to one particular embodiment, when the voice assistant detects the presence of the specific parameter in the communication-setup message 505, the configuring step 301 comprises negotiating a wideband codec, such as for example a G.722 or WB-AMR codec. To this end, the voice assistant 100 and/or the gateway 103 analyze the capabilities declared by the terminal 107 and/or the server 105 in the received call-setup message 504 or 505. Such capabilities are for example declared in a SDP (Session Description Protocol) message embedded in an SIP INVITE message. When at least one wideband codec is proposed by the terminal 107 or the server 105 in the message 504 or 505, the call-acceptance message 506 sent by the voice assistant 100 contains one or more wideband codecs that are supported by the assistant 100 and compatible with the offer present in the message 505. Such a measure makes it possible to guarantee that the quality of the communication between the terminal 107 and the assistant will be good. Thus, the results produced by the timbre-recognition algorithms (which allow the user to be identified) and the voice-recognition algorithms are improved. In this embodiment, when the server 105 receives, in step 200, a communication-setup request from the terminal 107, the response message 501 comprises at least one wideband-codec offer. In this way, the communication between the terminal 107 and the assistant is guaranteed to be of high quality, allowing the audio processing algorithms to perform well.

The invention thus allows the functions that capture the voice commands and that render the responses to be transferred from the assistant 100 to the terminal 107. The user thus accesses all of the services offered by the assistant remotely.

Figure 6:
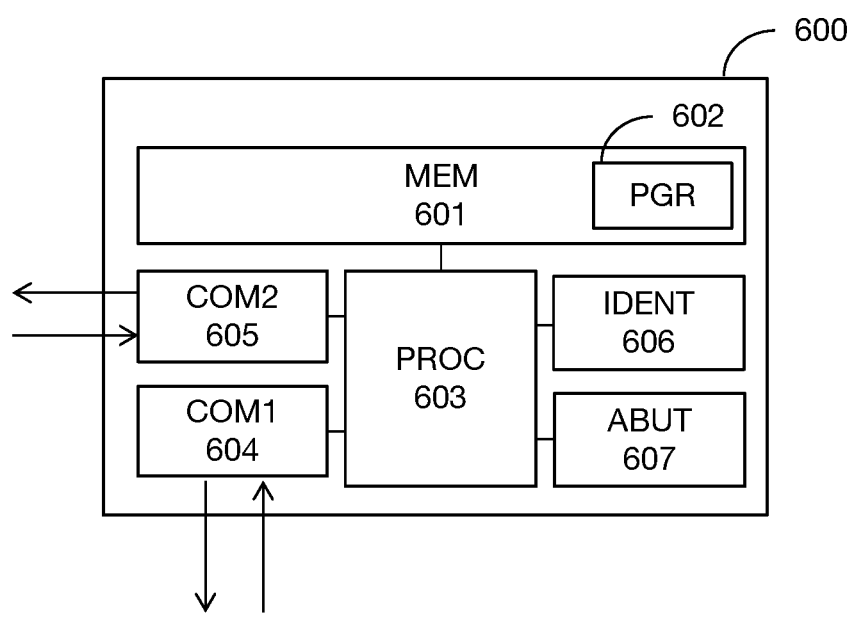
FIG. 6 illustrates the architecture of a device suitable for implementing the method for achieving remote access according to one particular embodiment.

FIG. 6 shows the architecture of a device 600 suitable for implementing the method for achieving remote access according to one particular embodiment.

The device 600 comprises a storage space 601, for example a memory MEM, and a processing unit 603 that is for example equipped with a processor PROC. The processing unit may be controlled by a program 602, for example a computer program PGR, containing instructions configured to implement the method for achieving remote access when they are executed by the processor PROC.

The instructions of the program PGR are in particular configured to implement the steps of: setting up a first communication with a caller terminal; obtaining, via the set-up communication, a datum identifying the voice assistant; transmitting a setup message for setting up a second communication to the voice assistant, the message containing at least one parameter suitable for activating a remote operating mode of the voice assistant; and connecting the first and second communications.

According to one particular embodiment, the instructions of the program PGR are furthermore configured to implement a step of obtaining an authenticating datum from the caller terminal, the step of transmitting a communication-setup message to the voice assistant then being dependent on a step of validating the obtained authenticating element.

In one particular embodiment, the program PGR is furthermore configured to implement a step of configuring a wideband codec for the first and second communications.

On initialization, the instructions of the computer program 602 are for example loaded into a RAM (Random Access Memory) before being executed by the processor of the processing unit 603. The processor of the processing unit 603 implements the steps of the method for achieving remote access according to the instructions of the computer program 602.

To this end, the device comprises, apart from the memory 601, a first communication module 604 (COM1) allowing the device to connect to a telecommunication network and to set up telephone communications via the telecommunications network, and in particular to receive a voice communication from a telephone terminal according to a communication standard. The module 604 is for example an Ethernet, 2G, 3G or 4G network interface associated with an SIP User Agent suitable for receiving audio communications from or transmitting audio communications to other terminals.

The device 600 also comprises an identification module 606, suitable for obtaining a datum identifying a voice assistant via the communication set up with the module 604, and for obtaining an address of a voice assistant. The module 606 is for example implemented via computer-program instructions that are executed by the processor PROC and that are configured to analyze the call-signaling messages received by the communication module 604 with a view to extracting therefrom the identifier of a voice assistant or a datum allowing a particular voice assistant to be identified. The module 606 for example comprises computer-program instructions allowing a caller-terminal identifier to be obtained from a call-signaling message, a database in which addresses of voice assistants are stored in association with call numbers to be consulted, and the address of a particular voice assistant to be obtained from the obtained caller number.

The device 600 comprises a second communication module 605 (COM2) allowing the device to connect to a telecommunication network and to set up telephone communications via this network, and in particular to set up bidirectional audio communications with a voice assistant. The module 605 is for example an Ethernet, 2G, 3G or 4G network interface or any other network interface suitable for implementing a protocol for setting up audio communications, such as the SIP protocol. The module 605 may be controlled by computer-program instructions that are suitable for being executed by the processor PROC and that are configured to obtain an address of a voice assistant from a signaling message received in a first communication set up via the communication module 604, and to set up a second communication with the voice assistant the address of which was obtained, the setup of the second communication comprising sending a message containing at least one parameter suitable for activating a remote operating mode of the voice assistant.

In one particular embodiment, the communication module 604 and 605 may take the form of a single communication module.

The device 600 lastly comprises a connection module 607. The connection module 607 is for example implemented via computer-program instructions that are suitable for being executed by a processor, for example the processor PROC, and that are configured to retransmit, via the interface 604, audio data packets received via the interface 605, and vice versa. These instructions are furthermore configured to relay the signaling messages received via the interface 604 to the interface 605, and vice versa.

According to one particular embodiment, the device 600 furthermore comprises an authentication module. The authentication module is for example implemented via computer-program instructions that are suitable for being executed by a processor and that are configured to obtain an authenticating datum, for example a PIN code, from the caller terminal via the module 604, the setup of a communication with the voice assistant via the module 604 being dependent on a step of validating the obtained authenticating element. Such a validating step for example comprises comparing an obtained PIN code with a code stored in memory in association with the identifier of the voice assistant to which remote access is desired.

According to one particular embodiment, the device 600 for achieving remote access is comprised in a server, for example an AS (Application Server) of an IMS network.

The invention claimed is:

1. A method for achieving remote access to a voice assistant, the assistant being suitable for setting up telephone communications with a communication terminal via a telecommunications network and having a local operation mode and a remote operating mode, the method comprising the following acts performed by a device that is remote from the voice assistant:
   setting up a first audio communication with a caller terminal,
   obtaining from the caller terminal, via the set-up communication, a datum identifying the voice assistant,
   transmitting a setup message for setting up a second audio communication to the identified voice assistant, the message containing at least one parameter suitable for activating the remote operating mode of the voice assistant in which the voice assistant:
      accepts automatically the second audio communication,
      replaces an audio system conventionally captured by the microphone of the identified voice assistant by a voice stream received from the caller terminal which contains a voice command,
      transmits to the caller terminal an audio stream obtained in response to said voice command, and
   connecting the first and second audio communications, retransmitting to the voice assistant an audio stream originating from the terminal and containing the voice command, and retransmitting to the terminal the audio stream originating from the voice assistant and obtained in response to said voice command.

2. The method according to claim 1, further comprising obtaining an authenticating datum from the caller terminal, the transmitting a communication-setup message to the voice assistant being dependent on an act of validating the obtained authenticating element.

3. The method according to claim 1, wherein the datum identifying the voice assistant is a call identifier of the caller terminal.

4. The method according to claim 1, where in the datum suitable for activating a particular operating mode is a parameter selected from among the following parameters:
   a particular caller number,
   a particular caller name,
   particular geo-positioning information,
   a particular header of an SIP message,
   a particular source IP address.

5. The method according to claim 1, comprising an act of configuring a wideband codec for the first and second audio communications.

6. A device for achieving remote access to a voice assistant, the voice assistance being suitable for setting up telephone communications with a communication terminal via a telecommunications network and having a local operating mode and a remote operating mode, the device being remote from the voice assistant and comprising:
- at least one processor; and
- a non-transitory computer-readable medium comprising instructions stored thereon, which when executed by the at least one processor configure the device to perform acts comprising:
- setting up a first audio communication with a caller terminal,
- obtaining from the caller terminal a datum identifying the voice assistant via the set-up communication, and obtaining an address of the voice assistant,
- transmitting to the obtained address a setup message for setting up a second audio communication, the message containing at least one parameter suitable for activating the remote operating mode of the identified voice assistant in which the voice assistant:
  - accepts automatically the second audio communication,
  - replaces an audio conventionally captured by the microphone of the identified voice assistant by a voice stream received from the caller terminal which contains a voice command,
  - transmits to the caller terminal an audio stream obtained in response to said voice command, and
- connecting the first and second audio communications, retransmitting to the voice assistant an audio stream originating from the terminal and containing the voice command, and retransmitting to the terminal the audio stream originating from the voice assistant and obtained in response to said voice command.

7. The device according to claim 6, wherein the device is implemented in a server.

8. A method comprising:
- processing a request for remote access to a voice assistant implemented at least partially by a processor and suitable for setting up telephone communications with a communication terminal via a telecommunications network, the voice assistant being associated with a microphone, a speaker, a voice-recognition device for analyzing a voice command pronounced by a user, the analysis being activated following detection of a keyword by the voice assistant, and with a voice-synthesis device for vocalizing a response to said voice command, the voice assistant having a local operating mode associated with the microphone and the speaker, the processing comprising the following acts performed by the voice assitant:
- receiving a setup message from a control device, which is remote from the voice assistant, for setting up a second voice communication with the control device, the message containing at least one remote access parameter suitable for activating a remote operating mode of the voice assistant, and wherein the control device has set up a first voice communication with a caller terminal;
- in response to receiving the setup message, switching from the local operating mode to the remote operating mode comprising the following subacts:
  - disabling the speaker and the microphone;
  - redirecting an incoming first audio stream, which is received from the caller terminal via the control device over the first and second voice communications, to the associated voice-recognition device, in replacement for the microphone; and
  - redirecting a second audio stream generated by the associated voice-synthesis device to an outgoing audio channel of the second voice communication; and
- transmitting a communication acceptance message to the control device in response to the setup message.

9. The method according to claim 8, wherein the switching to the remote operating mode furthermore comprises a configuring subact so that recording of the incoming first audio stream of the communication by the capturing device is activated without a keyword being detected.

10. The method according to claim 8, wherein the switching to the remote operating mode furthermore comprises a configuring subact so that a restriction of access to at least one service of the assistant is activated.

11. The method according to claim 8, wherein the switching to the remote operating mode comprises deactivating the microphone and/or the speaker of the voice assistant.

12. A device comprising:
- at least one processor; and
- a non-transitory computer-readable medium comprising instructions stored thereon, which when executed by the at least one processor configure the device to process a request for remote access to a voice assistant suitable for setting up telephone communications with a communication terminal via a telecommunications network, the voice assistant being associated with a microphone, a speaker, a voice-recognition device for analyzing a voice command pronounced by a user, the analysis being activated following detection of a keyword by the voice assistant, and with a voice-synthesis device for vocalizing a response to said voice command, the voice assistant having a local operating mode associated with the microphone and the speaker, wherein the instructions configure the device to process the request by:
- receiving a setup message from a control device, which is remote from the voice assistant, for setting up a second voice communication with the control device, the message containing at least one parameter suitable for activating a remote operating mode of the voice assistant, and wherein the control device has set up a first voice communication with a caller terminal;
- in response to the setup message, switching from the local operating mode to the remote operating mode, comprising:
  - redirecting an incoming first audio stream, which is received from the caller terminal via the control device over the first and second voice communications, to the voice-recognition device in replacement of the microphone; and
  - redirecting a second audio stream generated by voice-synthesis device to an outgoing audio channel of the second voice communication; and
- transmitting a communication acceptance message to the control device in response to the setup message when the remote operating mode is activated.

13. The device according to claim 12, wherein the device is implemented in the voice assistant.

14. A non-transitory computer-readable data medium comprising instructions stored thereon which when executed by a processor of a device, configure the device to remotely access a voice assistant, which is remote from the device, the voice assistant being suitable for setting up telephone communications with a communication terminal via a telecommunications network and having a local operating mode and a remote operating mode, the instructions configuring the device to:
- set up a first audio communication with a caller terminal,
- obtain from the caller terminal, via the set-up communication, a datum identifying the voice assistant,
- transmit a setup message for setting up a second audio communication to the identified voice assistant, the message containing at least one parameter suitable for activating the remote operating mode of the voice assistant in which the voice assistant:
  - accepts automatically the second audio communication,
  - replaces an audio stream conventionally captured by the microphone of the identified voice assistant by a voice stream received from the caller terminal which containes a voice command,
  - transmits to the caller terminal an audio stream obtained in response to said voice command, and
- connect the first and second audio communications, retransmitting to the voice assistant an audio stream originating from the terminal and containing the voice command, and retransmitting to the terminal the audio stream originating from the voice assistant and obtained in response to said voice command.

* * * * *